United States Patent [19]

Bamberger

[11] 4,230,682
[45] Oct. 28, 1980

[54] CYCLIC THERMOCHEMICAL PROCESS FOR PRODUCING HYDROGEN USING CERIUM-TITANIUM COMPOUNDS

[75] Inventor: Carlos E. Bamberger, Oak Ridge, Tenn.

[73] Assignee: The United States of America as represented by the United States Department of Energy, Washington, D.C.

[21] Appl. No.: 47,447

[22] Filed: Jun. 11, 1979

[51] Int. Cl.³ .............................................. C01B 1/02
[52] U.S. Cl. ................................. 423/579; 423/648 R
[58] Field of Search ..................... 423/579, 648 R, 598

[56] References Cited

U.S. PATENT DOCUMENTS

| | | | |
|---|---|---|---|
| 3,927,192 | 12/1975 | Bamberger et al. | 423/648 R |
| 3,929,979 | 9/1974 | Bamberger et al. | 423/648 R |
| 4,180,555 | 12/1979 | Bamberger et al. | 423/579 |

*Primary Examiner*—Wayne A. Langel
*Attorney, Agent, or Firm*—James E. Denny; Stephen D. Hamel; Allen H. Uzzell

[57] ABSTRACT

A thermochemical cyclic process for producing hydrogen employs the reaction between ceric oxide and titanium dioxide to form cerium titanate and oxygen. The titanate is treated with an alkali metal hydroxide to give hydrogen, ceric oxide, an alkali metal titanate and water. Alkali metal titanate and water are boiled to give titanium dioxide which, along with ceric oxide, is recycled.

8 Claims, 1 Drawing Figure

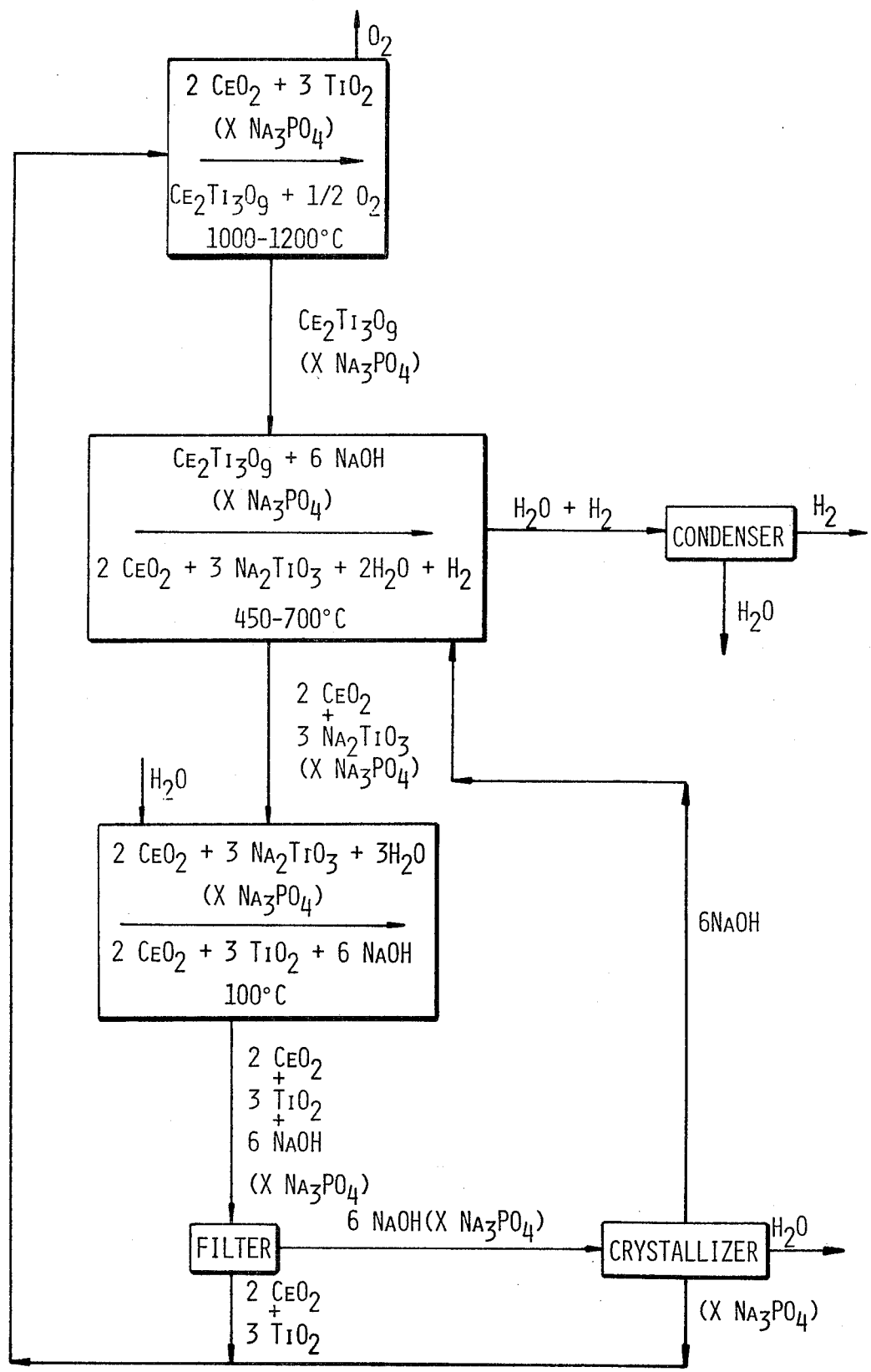

CYCLIC THERMOCHEMICAL PROCESS FOR PRODUCING HYDROGEN USING CERIUM-TITANIUM COMPOUNDS

BACKGROUND OF THE INVENTION

This invention is a result of a contract with the United States Department of Energy. It relates generally to the art of thermochemical hydrogen production.

Hydrogen is presently considered to be an attractive energy agent to be developed for future use. Hydrogen has many attributes which make it a logical replacement for fossil fuels which are being rapidly consumed and increasingly expensive. The combustion of hydrogen produces no obnoxious products and thus no harm to the environment.

Existing energy transport means and energy consuming equipment can be adapted to a hydrogen-based energy system using technology presently available. Natural gas pipelines, for example, can be converted to hydrogen carrying pipelines with minor modifications. Experimental automobiles are presently operating with modified conventional internal combustion engines using hydrogen as a fuel.

As the prospect of hydrogen utilization becomes increasingly likely, means for producing hydrogen need to be upgraded and increased. Conventionally, hydrogen has been produced by the electrolysis of water. Electrolysis, however, is highly inefficient in view of the less than 40 percent efficiency of electricity production coupled with an efficiency of about 80 percent for electrolysis. Inherent in the electrolytic production of hydrogen is the general futility of using one energy source, typically fossil fuels at present, to produce electricity which is then ultimately used to produce hydrogen at the point of electrolysis. The disadvantages of excess consumption of fossil fuels are obviously not overcome by such a process.

Chemical processes for the direct conversion of fossil fuels and water into hydrogen are presently feasible technically and overcome many of the inefficiencies and disadvantages of electrolysis. However, prudence indicates that fossil fuels should be preserved as much as possible for long term pharmaceutical, chemical and metallurgical uses.

Thermochemical processing presents the most attractive method for producing hydrogen. Using this technique, water is broken down into hydrogen and oxygen by a series of chemical reactions not involving the use of fossil fuels. This series of reactions is preferably carried out in a closed cyclic manner in which all products except hydrogen and oxygen are reused as reactants in the other reactions. One such process, disclosed in U.S. Pat. No. 3,490,871, utilizes the reaction of cesium with water to release hydrogen.

Another such process, disclosed by Grimes et al in U.S. Pat. No. 3,919,406, involves the reaction of copper and magnesium chlorides with water to produce hydrogen in a closed cyclic manner.

Another such process is disclosed by Bamberger et al in U.S. Pat. No. 3,927,192. The process therein disclosed comprises reacting chromium oxide with an alkali metal hydroxide to produce hydrogen, water and alkali metal chromate as reaction products.

Bamberger et al (U.S. Pat. No. 3,929,979) also disclose a cyclic process for splitting water wherein magnetite is reacted with an alkali metal hydroxide to give hydrogen, alkali metal ferrate and water as products.

Bamberger et al, in U.S. Pat. No. 3,996,343, disclose the production of hydrogen in a closed chemical cycle for the thermal decomposition of water by reaction of water with chromium sesquioxide and strontium oxide.

Bamberger et al (U.S. Pat. No. 4,005,184) employ chromium and barium compounds in a thermochemical process for producing hydrogen using barium and chromium compounds.

Ishii et al (U.S. Pat. No. 4,098,875) produce hydrogen thermochemically from water using tri-iron tetraoxide and hydrogen bromide as the main cyclic reaction media. The use of barium iodide, carbon dioxide and ammonia as cyclic reaction media is disclosed in U.S. Pat. No. 3,996,342.

OBJECTS OF THE INVENTION

An object of any thermochemical process is the direct use of heat from an energy producing facility requiring no fossil fuels, e.g., a nuclear reactor or a solar source. The upper temperature limits for these sources is about 1300° K. for a high temperature gas-cooled nuclear reactor and about 3500° K. for a solar furnace.

It is an object of this invention to provide a novel process for producing hydrogen from water.

It is a further object of this invention to provide a cyclic thermochemical process for splitting water into hydrogen and oxygen.

It is a further object to provide a novel process for producing oxygen from $CeO_2$, $TiO_2$, and a trialkali metal phosphate.

Another object is to provide the foregoing processes wherein all reactions are carried out at temperature about 1300° K. or below.

These and other objects are accomplished in a three-step process in which ceric oxide is reacted with titanium dioxide to produce cerium titanate and oxygen. The titanate is treated with an alkali metal hydrooxide to give hydrogen, ceric oxide, an alkali metal titanate and water. Alkali metal titanate and water are boiled to give titanium dioxide which, along with ceric oxide, is recycled. The production of oxygen by the reaction of ceric oxide and titanium dioxide is performed at lower temperatures when the reaction is conducted in the presence of a trialkali metal phosphate.

SUMMARY OF THE INVENTION

In one aspect this invention relates to a cyclic process for splitting water into hydrogen and oxygen, comprising the steps of:

(1) reacting ceric oxide and titanium dioxide to form cerium titanate and oxygen, and separating thus-formed oxygen from the reaction environment;

(2) reacting cerium titanate formed in step (1) with an alkali metal hydroxide, to form ceric oxide, an alkali metal titanate, water and hydrogen, and separating thus-formed hydrogen from the reaction environment;

(3) reacting ceric oxide and the alkali metal titanate formed in step (2) with water to yield ceric oxide, alkali metal hydroxide and titanium dioxide;

(4) recycling thus-produced ceric oxide and titanium dioxide to step (1); and (5) recycling thus-produced alkali metal hydroxide to step (2).

In another aspect, this invention relates to the production of oxygen by reacting ceric oxide and titanium dioxide in the presence of a trialkali metal (Na, K) phosphate to produce a cerium titanate and oxygen. When trialkali metal phosphate is present in step (1) of the above cyclic process, it can be conducted along with the solid reaction products to steps (2) and (3) without deleterious effects. The trialkali metal phosphate can be separated from the liquid phase of the products of step (3) and recycled to step (1).

BRIEF DESCRIPTION OF THE DRAWINGS

FIG. 1 is a schematic flow chart of one of the cyclic embodiments of the invention.

DETAILED DESCRIPTION

A three-step cycle for producing hydrogen and oxygen from water and heat is provided. The process comprises:

(1) reacting ceric oxide with titanium dioxide to yield cerium titanate and oxygen;

(2) reacting the cerium titanate with an alkali metal (Na, K) hydroxide to yield hydrogen along with ceric oxide, alkali metal (Na, K) titanate, and water; and (3) reacting the ceric oxide and alkali metal (Na, K) titanate in water to yield ceric oxide, titanium dioxide and alkali metal (Na, K) hydroxide.

One example of this process can be represented schematically by the following series of equations:

Step 1:

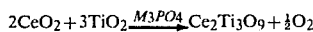

Step 2:

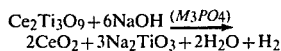

Step 3:

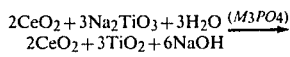

Net:

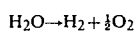

As used in the specification and claims, ceric oxide means cerium (IV) oxide or $CeO_2$. Alkali metal (M) means sodium or potassium (Na or K) and tri(alkali metal)phosphate means the tribasic salt, i.e., $Na_3PO_4$ or $K_3PO_4$. Cerium titanate means a material of the approximate composition $Ce_2Ti_3O_9$ or $Ce_2Ti_4O_{11}$. Alkali metal titanate means $M_2TiO_3$, wherein M is Na or K. The ($M_3PO_4$) in steps (2) and (3) indicate that $M_3PO_4$ can be present, but has little or no effect on the reactions.

The first reaction in the sequence can be represented in greater detail by the equation:

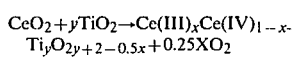

wherein x is about 0.7 to 0.9 and y is either 1.5 or 2. This general equation is based on evidence from x-ray powder diffraction patterns of the reaction products by analysis of which two reaction products were distinguished. Product "A" was generally produced with y=2 having the model or approximate formula $Ce_2Ti_4O_{11}$ and product "B" with y=1.5, and having the model approximate formula $Ce_2Ti_3O_9$.

The reaction of $CeO_2$ with $TiO_2$ can be performed by heating a mixture of $CeO_2$ and $TiO_2$ to a temperature sufficient to cause the evolution of molecular oxygen, generally at least about 1050° C., and preferably about 1100°–1300° C. When a trialkali metal phosphate is not present, the predominant cerium titanate is product A, produced according to the reaction

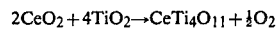

The addition of $M_3PO_4$ to the $CeO_2/TiO_2$ reaction mixture in an amount sufficient to give a Ce/P atomic ratio of 8 or less, preferably 8–10, results in the evolution of $O_2$ at a temperature about 200° below that observed using pure $CeO_2$ and $TiO_2$. When $M_3PO_4$ is present, the formation of the "B" cerium titanate product is favored. Oxygen evolution with an alkali metal phosphate present begins at a temperature as low as about 750° C., with about 1000°–1200° C. being preferred. A simplified equation for step 1 employing a trialkali metal phosphate is therefore:

It has been found that the alkali metal from the phosphate is actually incorporated into the structure of the cerium titanate product. The successful operation of the cycle does not require knowledge of the precise cerium titanate product.

The second step of the process can be represented by the chemical equation:

$Ce(III)_xCe(IV)_{1-x}Ti_yO_{2y+2-0.5x}+2yMOH\Delta$-
$CeO_2+yM_2TiO_3+0.5H_2+(2y-x)/2H_2O$;

where M is Na or K.

Hydrogen evolution begins in the range 450°–550° C. and reaches a maximum at 600°–700° C. The reaction goes to completion when about 20% excess of MOH with respect to the stoichiometry indicated in the equation is used. The reaction is unaffected by the presence or absence of $M_3PO_4$. A simplified equation for step 2 when product B is formed in step 1 is:

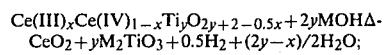

A simplified equation for step 2 when product A is formed in step 1 is:

$Ce_2Ti_4O_{11}+8NaOH\rightarrow2CeO_2+4Na_2TiO_3+3H_2O+H_2$.

Step 3 of the process is represented by the equation:

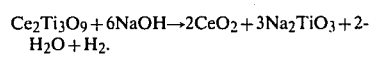

and is performed by reacting the products from step 2 in water at room temperature to the boiling point (25°–100° C.) and separating the solids from the supernatant for example by centrifugation. In the laboratory, a fluorocarbon beaker is used for this step instead of glass to prevent poisoning of the $CeO_2$—$TiO_2$ reaction by silica when ceric oxide and titanium dioxide are recycled to the first step.

Preferably, sodium salts are used throughout the reaction cycle. When trisodium or tripotassium phosphate is present for the reaction between $TiO_2$ and $CeO_2$, the first reaction will preferably be 1000°–1200° C.

Although the presence of a phosphate is not required for the second or third step of the cycle, the phosphate is conveniently carried along and recycled. In any case, the second step is preferably carried out at 450°–750° C. and the third step at the boiling point of water.

DESCRIPTION OF PREFERRED EMBODIMENT

In a most preferred aspect, the series of reactions will be as described above, as shown in FIG. 1, wherein
the reaction of step (1) is carried out at 1000°–1200° C.;
the reaction of step (2) is carried out at 450°–700° C.;
the reaction of step (3) is carried out at about the boiling point of water; and
the tri (alkali metal) phosphate is trisodium phosphate; the alkali metal hydroxide is sodium hydroxide; and the alkali metal titanate is sodium titanate.

In the first reaction step, $CeO_2$, $TiO_2$ and $Na_3PO_4$ (Ce/P atomic ratio of 8) are mixed and heated at 1000°–1200° C. until oxygen evolution is complete. Oxygen is recovered from the gaseous phase. In the second reaction step the solid phase $Ce_2Ti_3O_9$, along with unreacted $Na_3PO_4$, is mixed with solid NaOH and reacted at 450°–700° C. until hydrogen evolution is complete. Hydrogen and water vapor exit the reaction zone and water is condensed from the gaseous mixture, providing a hydrogen product. The solid products of the second reaction step, which contain $CeO_2$, $Na_2TiO_3$ and unreacted $Na_3PO_4$ are contacted with boiling water in the third reaction step to form a mixture of solid $CeO_2$ and $TiO_2$ and an aqueous solution containing dissolved NaOH and $Na_3PO_4$. The solid $CeO_2$ and $TiO_2$ are separated, e.g., by filtration, and recycled to the first reaction step. The aqueous solution is fractionally crystallized in any conventional manner to separate $Na_3PO_4$ from more soluble NaOH. NaOH can be recovered from solution and recycled to the second reaction step. $Na_3PO_4$ can be recycled to the first step. The separations of the process need not be complete and the purity of the starting materials is not critical. Those skilled in the art can easily perform the reaction steps on a continuous basis by providing appropriate mass transfer means.

Without further elaboration, it is believed that one skilled in the art can, using the preceding description, utilize the present invention to its fullest extent.

The following examples are to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

A mixture of 6 grams of $CeO_2$, 4 grams of $TiO_2$ and 4.4 grams of $Na_3PO_4.12H_2O$ was pelletized by hand with a die and placed in a platinum boat inside a silica tube. The tube was equipped with inlet and outlet openings for a carrier gas. The assembly was heated at rates between 2 and 4°/min by means of a tube furnace having carborundum resistance elements. Pure argon was passed through the assembly at about 100 ml/min to remove air and provide a carrier for the gases being evolved. The temperature was continuously increased to 1000° C., at which oxygen evolution was detected. The temperature was increased to 1200° C. and held until no further oxygen evolution was apparent. Oxygen evolution was measured by a Beckman Oxygen Analyzer. The amount of oxygen produced was about 200 ml (70–90% of theoretical). The product $Ce_2Ti_3O_9$ was identified in the residual pellet by neutron activation and by x-ray powder diffraction using CuKα radiation and a Debye-Scherrer camera.

EXAMPLE 2

Reactions were performed generally as described in Example 1. Loose powders were used or pellets were made from ceric oxide, titanium dioxide and varying amounts of trisodium phosphate. The correlation between mixture composition, and yield of product and structure is shown in the table.

Table

| Mixture Composition (grams) | | | Beginning of $O_2$ evolution (°C.) | %$O_2$ yield | Product |
|---|---|---|---|---|---|
| $CeO_2$ | $TiO_2$ | $Na_3PO_4.12H_2O$ | | | |
| 4 | 2.8 | 1.48 | 850 | 85 | B |
| 4 | 2.8 | 4.43 | 751 | 79 | B |
| 4 | 2.8 | 4.43 | 860 | 89 | B |
| 4 | 2.8 | 4.43 | 830 | 82 | B |
| 5.89 | 4.12 | 0 | 1202 | 36 | not analyzed |
| *5.87 | 4.09 | 1.29 | 819 | 90 | B not analyzed |
| *5.88 | 4.09 | 1.62 | 905 | 88 | B |
| 6.75 | 6.28 | 0 | 1063 | 7 | A |
| 6.74 | 6.28 | 0 | 1186 | 78 | A |
| 6.70 | 6.24 | 0 | 1173 | 57 | A |

EXAMPLE 3

A mixture of 4 grams of $Ce_2Ti_3O_9$ obtained as in Example 1 and 2 grams of NaOH was reacted by heating in a platinum boat in a silica tube in a tube furnace, described above. The temperature was continuously increased at a rate of 2–4° C./min to 450°–550° C. and the system was purged with a stream of argon. The exit gases were dried by passage through a water cooled condenser and then through anhydrous calcium sulfate. Hydrogen evolution was detected at 450°–550° C. and was measured by thermal conductivity (Gow-Mac Analyzer). The instrument was calibrated repeatedly with a mixture of 4% $H_2$-Ar. Maximum hydrogen evolution occurred at a temperature in the range of 600°–700° C. The experiment produced about 130 ml of hydrogen (90–95% yield).

EXAMPLE 4

Solid product (1–3 g) obtained as in Example 3 was ground and boiled with 100–200 ml of water for 6–8 hours in a tetrafluoroethylene beaker. The solid was separated from the supernatant by centrifugation. The liquid was removed by decantation and determined to contain sodium hydroxide. The residue, dried at 25° C. in a stream of air, was a mixture of $CeO_2$ and $TiO_2$ (x-ray fluorescence analysis). The residue of cerium (IV) oxide and titanium dioxide (1.5–3 g) was mixed with varying amounts of $Na_3PO_4.12H_2O$ and heated as in Example 1. Evolution of oxygen began at 1000°–1100° C. Oxygen yields generally about 80% were obtained.

EXAMPLE 5

Pellets obtained as in Example 3 were ground and exposed to boiling water in a borosilicate glass (Pyrex$^R$) soxhlet extractor for about 12 hours as in Example 4. The dried product (~7 g) was mixed with ~1.5 g of $Na_2PO_4.12H_2O$ and heated as in Example 1. Very little oxygen was evolved. Accordingly, the introduction of siliceous impurities in the third reaction step is considered undesirable.

EXAMPLE 6

Pellets are prepared from 5 g of ceric oxide, 3.5 g of titanium dioxide and 1.1 g of tripotassium phosphate (0.12H$_2$O) and heated as in Example 1. Oxygen evolution should occur at around 900° C. The yield of oxygen should be comparable to that of Example 1.

EXAMPLE 7

Pellets prepared as in Example 2 (5.1 g residual weight) were mixed with 5.2 g of KOH (87% pure, a 31% excess) and heated as in Example 4. Hydrogen evolution occurred at 454° C. The yield was about 100%.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A cyclic process for splitting water into hydrogen and oxygen, comprising the steps of:
   (1) reacting ceric oxide and titanium dioxide to form cerium titanate and oxygen, and separating thus-formed oxygen from the reaction environment;
   (2) reacting cerium titanate formed in step (1) with an alkali metal hydroxide, to form ceric oxide, an alkali metal titanate, water and hydrogen, and recovering the thus-formed hydrogen;
   (3) reacting ceric oxide and the alkali metal titanate formed in step (2) with water to yield ceric oxide, alkali metal hydroxide and titanium dioxide;
   (4) recycling thus-produced ceric oxide and titanium dioxide to step (1); and
   (5) recycling thus-produced alkali metal hydroxide to step (2).

2. The process of claim 1 in which step 1 is performed in the presence of trisodium phosphate or tripotassium phosphate.

3. The process of claim 2 in which steps (2) and (3) are performed in the presence of trisodium phosphate or tripotassium phosphate from step (1), and further comprising recovering and recycling said trisodium phosphate or tripotassium phosphate from the product mixture of step (3) to step (1).

4. The process of claim 2, wherein the alkali metal hydroxide is sodium hydroxide; the alkali metal titanate is sodium titanate, and step (1) is performed in the presence of trisodium phosphate.

5. The process of claim 2, wherein:
   the reaction of step (1) is carried out at 1000°–1200° C.;
   the reaction of step (2) is carried out at 450°–700° C.;
   the reaction of step (3) is carried out at about the boiling point of water; and
   the alkali metal hydroxide is sodium hydroxide; and the alkali metal titanate is sodium titanate, and step (1) is performed in the presence of trisodium phosphate.

6. The process of claim 1, wherein the reaction of step (1) is carried out at 1100°–1300° C.

7. The process of claim 1, wherein the reaction of step (2) is carried out at 450°–700° C.

8. The process of claim 1, wherein the reaction of step (3) is carried out at about the boiling point of water.

* * * * *